R. A. COURTNEY & L. J. FOSTER.
Stump-Extractor.
No. 220,900. Patented Oct. 21, 1879.
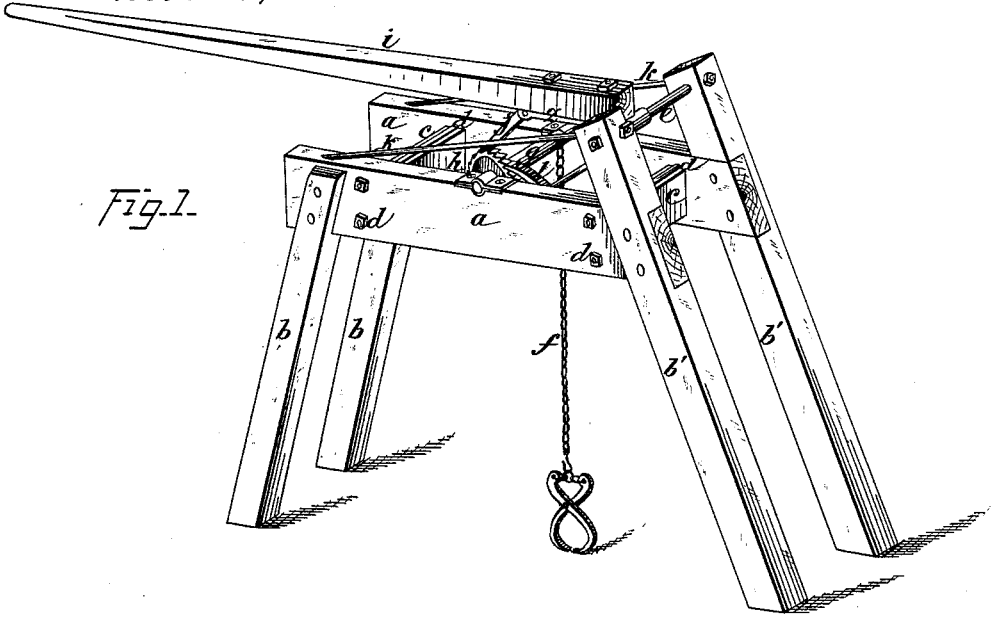
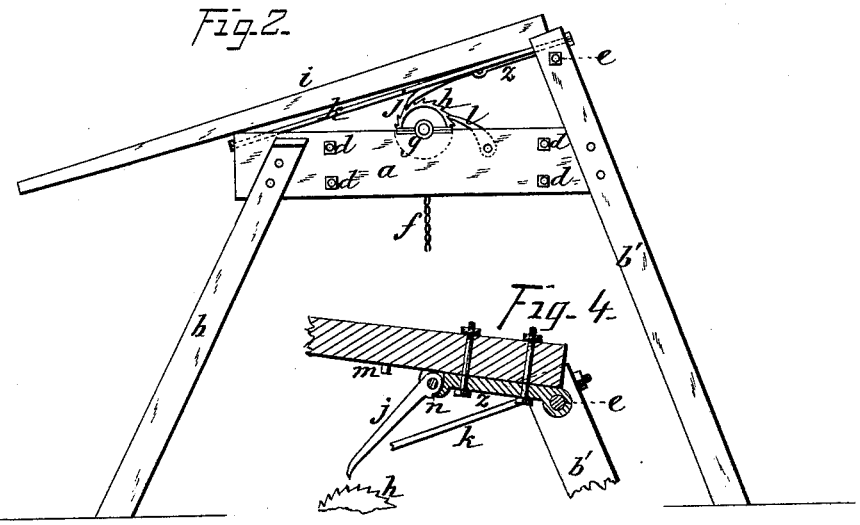
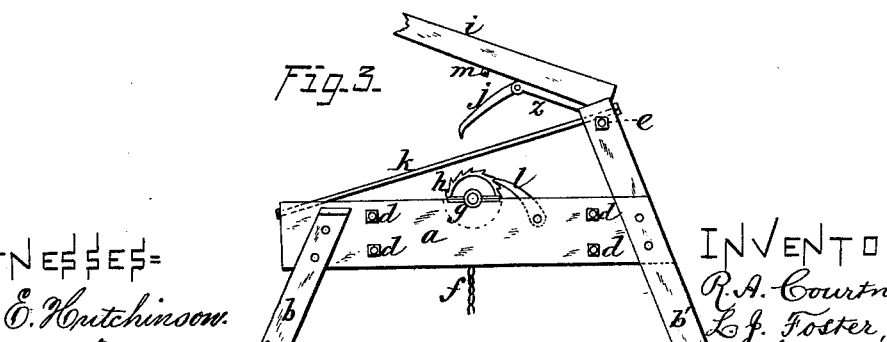

UNITED STATES PATENT OFFICE.

ROBERT A. COURTNEY AND LORENZO J. FOSTER, OF KENTON, TENNESSEE.

IMPROVEMENT IN STUMP-EXTRACTORS.

Specification forming part of Letters Patent No. 220,900, dated October 21, 1879; application filed September 3, 1879.

*To all whom it may concern:*

Be it known that we, ROBERT ALONZO COURTNEY and LORENZO JEFFERSON FOSTER, of Kenton, in the county of Obion and State of Tennessee, have invented certain new and useful Improvements in Stump-Extractors; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

We have constructed a machine for pulling stumps and grubs in land in which the working-lever and its supporting-frame are connected and braced to give great strength to sustain the downward force, and to make a durable structure for the purpose.

The lever is secured to a strong bar, which, being mounted at one end upon a top cross-brace rod of the frame, carries at its other end a hinged pawl, which works the winding-shaft ratchet. The force exerted by the pawl is borne by two brace-rods, which extend from the tops of one set of frame legs or supports diagonally to the opposite ends of the side bars, to which the other set of frame-legs are attached, so as to bring the bracing action of these diagonal rods in a line, or nearly so, with the action of the pawl, so that the lever is mounted upon the extended ends of one set of frame-legs, which are braced in the line of the greatest force exerted by the pawl.

Referring to the drawings, Figure 1 represents our improved stump-extractor in perspective. Fig. 2 is a side elevation, showing the lever, its winding-pawl, and the diagonal frame-braces nearly in line at the point in which the lever is fully depressed. Fig. 3 shows the lever and pawl raised so as to clear the ratchet and the action of the joint-stop, and Fig. 4 is an enlarged sectional view of the same.

The frame consists of two strong side pieces, *a a*, supported by legs *b b'*, standing obliquely and secured by strong bolts. The side pieces are also connected and braced by cross-ties *c* and screw-rods *d* above and below said ties. The legs *b'* rise above the side pieces a suitable distance, and serve to support the working-lever by means of a cross-rod, *e*, at the extended ends of said legs.

The pulling-chain *f* is carried by a winding-shaft, *g*, which is mounted in suitable boxes at about the middle of the length of the side pieces, and which carries a ratchet-wheel, *h*, just inside of one of the side pieces. The lever *i* is attached by screw-bolts to a strong bar, *z*, having an eye at one end, by which it is secured upon the cross-rod *e*, and a suitable hinge-connection at the other end for the pawl *j*, arranged to take into and revolve the winding-shaft ratchet.

The lever extends back some distance beyond the short legs to give the proper leverage, and the extended legs are braced by diagonal brace-rods *k*, extending from their upper ends to the opposite ends of the side pieces, to which they are suitably secured by screw-nuts.

This construction, it will be seen, brings the great strain of the lever upon the diagonal brace-rods in a manner to sustain the pulling force of the winding-shaft, and the relative arrangement of the pawl, the lever, and the diagonal braces is such as to bring them nearly in line at the point in which the pawl is exerting its greatest force. Thus, while giving great lifting power, the construction gives great resisting strength.

A check-pawl, *l*, is arranged to engage with the ratchet to hold the winding-shaft during the working. The under side of the lever is provided with a stop-pin, *m*, to limit its descent and maintain the pawl *j* always in gear with the ratchet. The lever-pawl is provided with a joint-shoulder, *n*, adapted to form a stop to prevent the pawl moving back of the ratchet in case the lever is lifted higher than is necessary, as shown in the detail section, Figs. 3 and 4. This shoulder-joint and stop-pin render the action of the pawl *j* certain in any position of the lever.

In working the lever its pawl acts to turn the ratchet by downward pressure and winds the chain. The lever should be raised only sufficient to allow the pawl to have a movement over one or two of the ratchet-teeth, and the lever and pawl being in the same line of action, the full power of the lever is exerted in a manner to give the greatest pulling or elevating force.

Any suitable form of hook or grappling device may be used with the chain.

We are aware that levers have been provided in various ways with pawls for operating the winding-shaft ratchet in a stump-extractor, and that the frame in which the working-lever and the ratchet are mounted has been braced to the main beams to resist the lifting force of the lever, and we do not claim, broadly, such construction; but in our plan the lever is secured to the extended legs of the frame by a strong bar, z, which, forming the hinge at one end, carries the pawl at its other end, so that the force will be borne in the line of said lever-bar, and the extended legs are braced from the rear ends of the side pieces, a a, so as to sustain the force of the lever by a direct pull from the ends of said side pieces.

We claim—

1. The combination, with the working-lever of a stump-extractor, of the bar z, secured to the under side of said lever and to the leg-extension by the cross-rod e, and the pawl j, secured to the opposite end of said bar, substantially as shown and described.

2. A stump-extractor consisting of the side pieces, a a, the supporting-legs b b', the working-lever i, secured to the extensions of the legs, b', by the cross-rod e, and the bar z, said bar carrying the pawl j at its inner end, the diagonal braces k k, extending from the leg-extensions to the front ends of said side pieces, the ratchet-wheel h on the winding-shaft, and the check-pawl l, all constructed substantially as shown and described.

In testimony that we claim the foregoing we have hereto affixed our signatures in the presence of two witnesses.

ROBERT ALONZO COURTNEY.
LORENZO JEFFERSON FOSTER.

Witnesses:
WM. F. JONES,
J. B. BOON.